United States Patent

Wighard

[11] Patent Number: 5,813,234
[45] Date of Patent: Sep. 29, 1998

[54] DOUBLE ACTING PULSE TUBE ELECTROACOUSTIC SYSTEM

[76] Inventor: Herbert F. Wighard, 9122 S. Federal Hwy., Suite 258, Port St. Lucie, Fla. 34952

[21] Appl. No.: 719,393

[22] Filed: Sep. 24, 1996

Related U.S. Application Data

[60] Provisional application No. 60/004,368 Sep. 27, 1995.
[51] Int. Cl.$^6$ ..................................................... F25B 9/00
[52] U.S. Cl. ...................................................... 62/6; 62/467
[58] Field of Search ............................................ 62/6, 467

[56] References Cited

U.S. PATENT DOCUMENTS

| | | | |
|---|---|---|---|
| 4,625,512 | 12/1986 | Müller | 62/467 X |
| 4,722,201 | 2/1988 | Hoffler et al. | 62/467 |
| 5,269,147 | 12/1993 | Ishizaki et al. | 62/467 |
| 5,275,002 | 1/1994 | Inoue et al. | 62/6 |
| 5,303,555 | 4/1994 | Chrysler et al. | 62/6 |
| 5,647,216 | 7/1997 | Garrett | 62/6 |

OTHER PUBLICATIONS

Garrett, Steven L.; "Thermoacoustic Life Sciences Refrigerator" Oct. 30, 1991, NASA Report LS–10114.

*Primary Examiner*—Christopher Kilner
*Attorney, Agent, or Firm*—Malin, Haley, DiMaggio & Crosby

[57] ABSTRACT

A electroacoustic cooling engine comprising a resonator pressure vessel for containing a compressible fluid, a double acting flexural disk centrally located in the resonant pressure vessel, an electromagnetic driver supported outside the vessel for driving the disk from outside the vessel, a thermodynamic element on each side of the disk and a pair of heat exchangers on opposite sides of the thermodynamic element. The electromagnetic driver linearly actuates the disk to cyclically drive a standing acoustic wave on both sides of the disk through each thermodynamic element and heat exchanger pair to generate a desired thermal response in a working fluid flowing through each heat exchanger.

24 Claims, 7 Drawing Sheets

DOUBLE ACTING PULSE TUBE ELECTROACOUSTIC SYSTEM

BACKGROUND OF THE INVENTION

This application claims the benefit of U.S. Provisional application Ser. No: 60/004,368, filed Sep. 27, 1995, now abandoned.

1. Field of the Invention

The present invention generally relates to electroacoustic cooling systems, and more particularly, to an electromagnetic driven electroacoustic cooling engine having a double acting flexural disk centrally located in a resonant tube-like pressure vessel and an electromagnetic driver mechanism supported outside the vessel for driving the disk.

2. Description of the Prior Art

Thermoacoustic technology addresses, among other things, the need for eliminating CFCs, HCFCs and other dangerous ozone depleting chemicals found in conventional air conditioning systems. Thermoacoustic cooling systems, however, are known to have efficiency problems and as a result have not been widely utilized in commercial and residential applications.

Thermoacoustic cooling systems, such as that described in U.S. Pat. No. 4,722,201, generally include heat pumps or refrigerating engines that drive acoustic waves inside resonant pressure vessels or refrigerating engines. Thermoacoustic cooling engines provide thermal performance by displacing or pumping compressible fluids inside a resonant pressure vessel with an acoustic standing wave. The acoustic standing wave is typically generated by an acoustic driver. The compressible fluid utilized contains a large thermal expansion coefficient and must be capable of supporting an acoustic standing wave. The pressure vessel is typically one-quarter (¼) to one-half (½) of the length of the standing wavelength. The fluid used can usually be a mixture of helium, argon, and/or neon. The thermoacoustic cooling engine incorporates an acoustic driver to cyclically drive the fluid with a generated acoustic standing wave through a thermodynamic element. The thermodynamic element generally comprises a plurality of plates and is located near the acoustic driver, is in thermal communication with the fluid and is thermally responsive to the acoustic standing wave. The thermal response of the thermodynamic element to the acoustic standing wave is the pumping of heat from one end to another. A hot heat exchanger and cold heat exchanger are placed in thermal communication with the thermodynamic element to conduct heat from the thermodynamic element and to cool a load, respectively. The hot heat exchanger conducts heat from one end of the thermodynamic element. A heat sink is typically located outside the resonant pressure vessel and receives heat from the hot heat exchanger. The cold heat exchanger is in thermal communication with the opposite end of the thermodynamic element and is thermally coupled to a load to be cooled. The thermoacoustic heat pump acoustically pumps the fluid back and forth between the plates or stack of plates, thereby stimulating heat to flow across the plates.

While thermoacoustic cooling technology addresses the need for replacing CFCs, HCFCs, and other ozone or planet warming chemicals, conventional thermoacoustic cooling engines have efficiency problems that affect their thermal performance to a level that impedes widespread use. One of the main problems causing diminished efficiency performance is generation of internal waste heat gain that is lost from the power coils used in the various electric driver mechanisms. Internal heating is attributable to driving the acoustic driver from within the vessel, internal friction of moving parts and fluid, cold ends of the thermodynamic element plates being in thermal contact with the driver via acoustically driven convective flows in the gas, reverse flow of heat in the thermodynamic element, and the internal heat generated by the driver coils. Efficiency is further decreased because only half the driver stroke cycle is utilized to drive a single stack. Efficiency degradation is also affected by reverse conduction through the fluid and plates. Poor efficiency affects the overall operation of the thermoacoustic engine and results in unforgiving energy losses.

Given the current environmental concerns with cooling systems dependent upon CFCs, HCFCs and other ozone depleting chemicals, thermoacoustic cooling engines would be a more attractive replacement for larger cooling applications if their efficiency, power density, and cooling capacity were increased. Accordingly, there exists a continuing desire to increase the efficiency and power density of thermoacoustic cooling systems and heat pumps. The instant invention addresses these needs by providing a double acting acoustic driver powered by an electromagnetic circuit for driving at least two stacks and two pairs of heat exchangers in a pulse tube resonator or pressure vessel. The instant invention provides advantages to conventional thermoacoustic air cooling systems, such as increased power density, cooling capacity, and overall efficiency, through the combined efforts of a double-acting disk, the placement of the driving mechanism outside the pressure vessel to decrease internal heat gain, and the employment of multiple heat exchangers and thermal stacks.

SUMMARY OF THE INVENTION

One object of the present invention is to provide a electroacoustic cooling engine or heat pump with increased power densities, larger cooling capacities and better operating efficiencies.

Another object of the invention is to provide a electroacoustic heat pump with an electromagnetic driver that is suitable for use on water-chillers or coolers, air conditioners, and large capacity heat pumping applications for residential, commercial, and industrial sized heating, cooling, and refrigeration systems, plastic molding injection systems, etc.

It is also an object of the present invention to provide a electroacoustic cooling engine comprising a double acting acoustic driver in a pulse tube electroacoustic resonator with improved thermal efficiency.

It is another object of the invention to provide a more efficient electroacoustic cooling engine that eliminates the need for CFCs, HCFCs, and all other dangerous and ozone depleting chemicals in both large and small size cooling systems.

An additional object of the instant invention is to eliminate the need for sliding seals, bearings, and lubrication in the electroacoustic driver and to prevent destructive pressure differentials from developing at opposite sides of the acoustic driver's flexible disk.

It is a further object of the instant invention to eliminate the need for any lubrication inside the pressure vessel.

It is yet another object of the invention to reduce internal heat loss in the pressure vessel to afford improved efficiency.

It is a further object of the instant invention to provide a more efficient electroacoustic driver by driving the internal driver flexural disk via energy transfer techniques.

It is yet another object of the instant invention to provide a resonator that facilitates convenient adjustments in the driver disk's positioning.

It is yet an additional object of the instant invention to provide an adjustable electroacoustic driver.

It is yet a further object of the instant invention to provide preloaded but adjustable springs for fine resonance tuning of the electroacoustic driver.

It is still another object of the instant invention to fine tune the electroacoustic driver without having to alter the gas mixture to attain pressure vessel resonance.

In light of these and other objects, the present invention comprises a electroacoustic cooling engine employable as a chiller for fan coils, air conditioning systems, heat pump systems, or other residential and commercial climate control systems. The electroacoustic cooling engine includes a double acting acoustic driver mechanism that yields a power stroke in two directions under the control of electromagnetic power. Consistent with the foregoing, the instant invention generally comprises a resonant pressure vessel or acoustic resonator filled with a compressible fluid or gas, a resonance frequency controller, at least one pair of thermodynamic/thermal elements, two pairs of oppositely disposed heat exchangers, a means for charging the resonator with the gas, and a double-acting acoustic driver including at least one centrally located flexible driver disk secured inside the resonator, a spring suspended shaft that extends throughout the resonator and drives the desired number of disks, and an electromagnetic driver comprising a plurality of magnets and power coils for cyclically driving the shaft and disk.

The electroacoustic engine of the invention increases the power density by utilizing both the forward and return strokes of the flexible disk, thereby increasing the useable cooling capacity by a factor of two. The flexible disk is positioned in the resonator between a first and second thermodynamic element and heat exchanger pair, essentially dividing the resonator into first and second pressure vessel volumes. The thermodynamic/thermal elements preferably comprise a coiled non-metallic material that forms a spiral concentric with the interior resonator walls. The thermal element has a width which is much less than the reduced wavelength of sound. In addition, the ratio of stack spacing in the element to penetration depth is large enough so that hyperbolic tangents involving the ratio can be set equal to one. The heat exchangers preferably comprise a finned coil of copper tubing that allows the fluid to be cooled or heated as the fluid is circulated through it. The heat exchangers may also comprise a copper stack assembly placed in cross section within the copper tubing. A standing acoustic wave is cyclically driven by the acoustic driver on both sides of the disk for a resultant thermal response.

The pulse tube/resonator vessel preferably comprises a cylindrical tube-like container that is one full wavelength long end-to-end, and one-half wavelength long from the flexible disk to an end of the resonator. The resonator vessel may be formed by joining two half wavelength pressure vessels at a common sealable, gastight joint. This joint exists at the point of the flexible disk and may be used to secure the disk along its peripheral edges. This center joint will not be necessary if the flexural disk is secured to the interior wall of the resonator, such as with a mounting ring, thereby eliminating another possible area of leakage. The resonator vessel is pressurized with a compressible fluid, or gas, having a substantial thermal expansion coefficient and the ability to support an acoustic standing wave generated by the double-acting acoustic driver. The double-acting acoustic driver comprises a double-acting flexural disk that stimulates two opposing thermodynamic elements and two pairs of heat exchangers. With a different symmetry, the disk can stimulate four or more pairs of opposing thermodynamic elements and four or more pairs of heat exchangers. The flexural disk preferably comprises a flexible driver disk substantially located centrally within the resonator vessel for displacing the compressible fluid through the thermodynamic elements with a standing acoustic wave as the disk is cycled. The driver disk is preferably flexible near its perimeter edges and rigid along its interior surface area to optimize gas displacement. The flexible disk may be attached to the suspended drive shaft by a securing plate which helps to effect central rigidity in the disk. The acoustic disk's frequency of operation is adjusted automatically to keep the system in resonance. The acoustic driver further includes an electromagnetic driver mechanism for cyclically driving the disk and hence, the gas.

The instant invention, unlike conventional systems, does not drive or power the driver disk from inside the resonator pressure vessel, but rather from outside the sealed unit. This avoids the need to remove any internal heat gain generated by the driver's power coils, a problem noted when the driver is placed inside the system and a problem known to decrease a unit's efficiency. The electromagnetic driver of the present invention comprises a plurality of electric drive coils having a predetermined number of turns, magnetic rings, and fixed iron pole pieces mounted to an aluminum or other non-magnetic shaft. The electromagnetic driver mechanism disclosed herein provides enhanced performance by communicating magnetically with the driver shaft from outside the vessel with the mechanically suspended shaft found in the vessel and attached to the disk. The shaft is preferably attached to the disk at its rigid section. Thus, placing the electromagnetic driver coils outside the resonator and transferring energy to the flexible driver disk by way of the suspended shaft prevents most of the internal heating of the pressure vessel from the driver coils so as to avoid diminished efficiency. In addition, by placing the power coils of the driver mechanism outside the resonator, the electromagnetic driver can have as many coils with more turns and matching permanent magnets and pole pieces as is necessary to achieve the desired power levels. That is, the instant invention allows for a much larger outside area upon which to wind many more power coils without affecting the interior volume of the resonator and without realizing the problems currently associated with oscillating heavy loads as in conventional internally powered voice coil acoustic systems.

The instant invention comprises a double-acting acoustic driver, wherein at least one thermodynamic element, or stack, and one pair of heat exchangers are positioned inside the resonator on opposite sides of the driver disk so that heat may be transferred through the thermal element. Heat is pumped through the element by the acoustic standing wave generated by the acoustic driver and supported by the compressed gas. Both pairs of heat exchangers comprise a hot heat exchanger and a cold heat exchanger. The hot heat exchanger is in thermal communication with one end of the thermodynamic element, while the cold heat exchanger is in thermal communication with an opposite end of the thermal element. The hot heat exchanger conducts heat away from the thermal element and the cold heat exchanger releases heat and cools a fluid load passing therethrough. The instant invention enhances cooling efficiency, compared to conventional systems, by folding or coiling copper tubing to create a radiator-like cold heat exchanger. The instant invention provides substantially better efficiency and double the power density of conventional quarter wavelength heat pumps by placing a thermodynamic element on opposite sides of the driver disk, each with its own cold and hot heat exchangers, and by driving the disk from outside the resonator with the electromagnetic driver. Placing a thermal element and heat exchanger pair on both sides of the disk allows the electroacoustic engine to take advantage of both the front and backward strokes of the disk so as to provide twice the power density. Greater cooling capacity is also achieved with the increased efficiency accomplished by the acoustic driver and thermodynamic configurations.

The instant invention may further include a plurality of substantially rigid volume reduction trumpeting baffles inside the pressure vessel, so as to decrease the internal volume of the resonator to achieve a larger percentage by volume of displacement of the working fluid with each stroke of the flexural disk. The baffles also help to prevent an impedance mismatch between the free resonator volume and the thermodynamic element and the formation of shock waves in the gas. The baffles also facilitate more efficient and increased travel of the gas through the thermodynamic element since the baffles reduce the interior volume of the resonator. As previously noted, smaller volumes are preferred for enhanced electroacoustic performance. The trumpeting baffles are preferably rigid, funnel-shaped, and smooth in structure. Smooth baffles reduce viscous losses. Rigid baffles could be used to secure the driver disk by way of a compression force. The baffles could also be designed with an insulating filler, such as foam, to retard external heat infiltration. The baffles should be made of an insulated material to provide insulation from the exterior walls. The baffles may comprise other shapes and structures different from those disclosed herein without departing from the scope and spirit of the instant invention.

The present invention is intended to replace the usual compressor, valves or vanes, expansion valves or capillary tubes, lubricating methods, and requirements for liquid chemicals that continuously must be made to change their state from a liquid to a gas and back again, such as is used now in other heat-pumping systems. The cold heat exchangers chill the operating fluid load along two paths via a thermal-responsive acoustic standing wave generated by the disk and propagated through the cold heat exchanger and thermodynamic elements. The chilled fluid flows from the cold heat exchanger to a radiator or coil located outside the resonator vessel where either a fan or other similar mechanism can blow air across the chilled fluid to produce a cooled air, as is known in the art. The instant invention allows fluid chillers, such as water chillers, to be used for large capacity cooling applications, including residential, commercial, and industrial air conditioning systems and large refrigeration systems. The instant invention is intended to provide approximately twice the power density of current thermoacoustic systems with the same sized resonator diameter.

One of the main objectives of the instant invention is to eliminate the need for using CFCs, HCFCs, and other dangerous ozone depleting chemicals in air conditioning systems by providing a more reliable electroacoustic cooling engine than has been previously known. The instant invention accomplishes this in part by eliminating the need for any sliding seals, bearings, and lubrication, whereby the electromagnetically driven acoustic driver is used to cycle the shaft and hence, the flexible driver disk from outside the vessel. In addition, problems associated with the destructive pressure differentials known to develop on opposite sides of a single-acting disk are eliminated with the instant invention by creating equal pressures on both sides of the disk. Thus, this design eliminates problems in the prior art associated with back pressure. The pressure on both sides of the driver disk equalizes rapidly through orifices located in the shaft to facilitate rapid charging of the system and to reduce the likelihood of destructive pressure differentials.

The instant invention is designed to obtain far higher cooling powers. The invention also facilitates the building of a cooling system with a reduced chance of developing leaks because of the reduction in the number of exterior joints and seams. The few seams that exist can be welded or soldered closed by eliminating non-metallic joints so as to facilitate operation of the electroacoustic engine at higher pressures for increased power densities.

In accordance with these and other objects which will become apparent hereinafter, the instant invention will now be described with particular efforts to the accompanying drawings.

BRIEF DESCRIPTION OF THE DRAWINGS

FIG. 7 is a cross sectional view of the instant invention taken along line 7—7 of FIG. 1a.

DESCRIPTION OF THE PREFERRED EMBODIMENTS

Figures 1A, 1B:
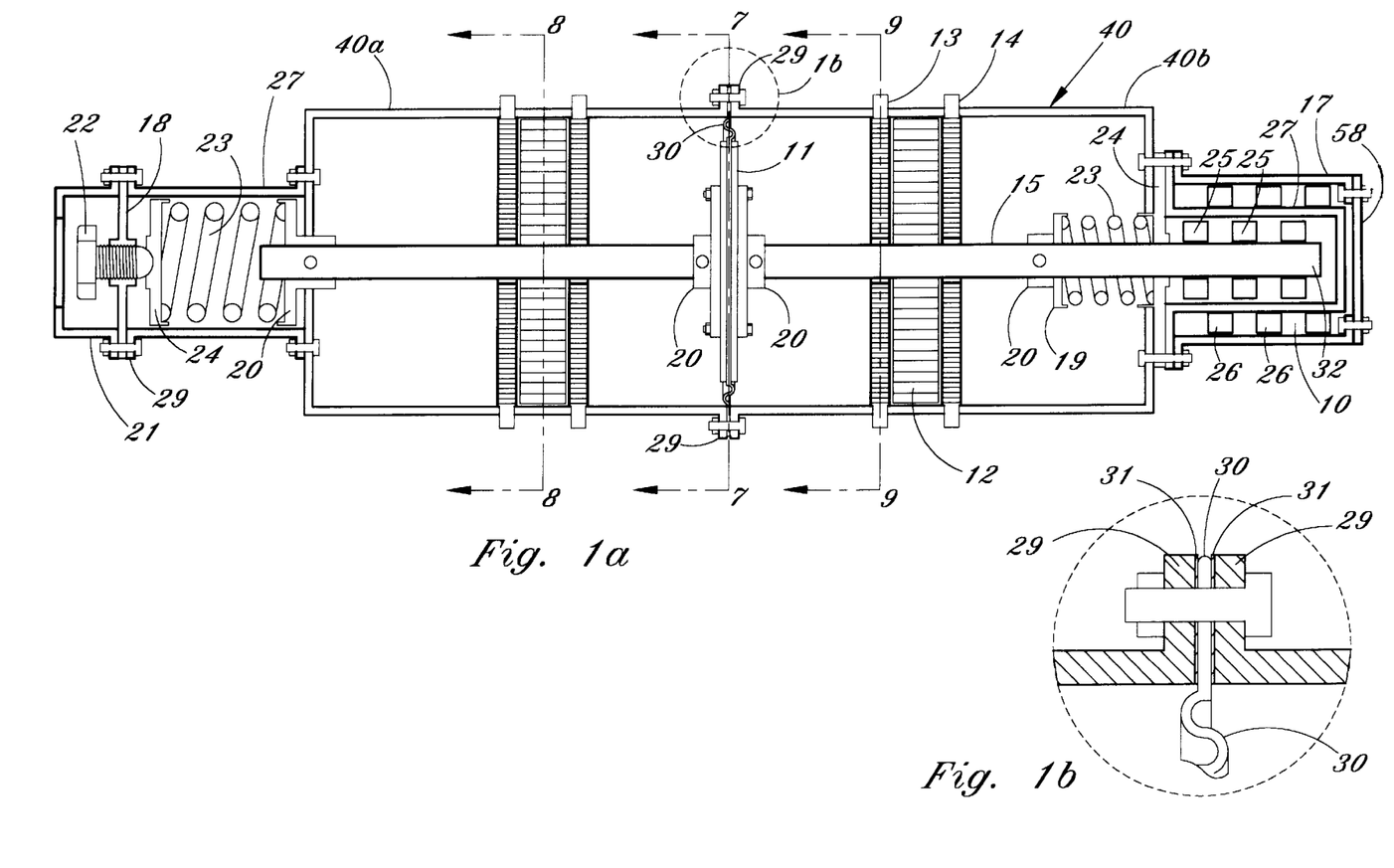
FIG. 1a is a cross sectional view of the electroacoustic cooling engine illustrating the resonator and double acting acoustic driver of the instant invention, including optimal placement of the electromagnetic driver power coils outside the resonator.
FIG. 1b is an enlarged detailed view of the resonator flanges of the instant invention.
Figure 2:
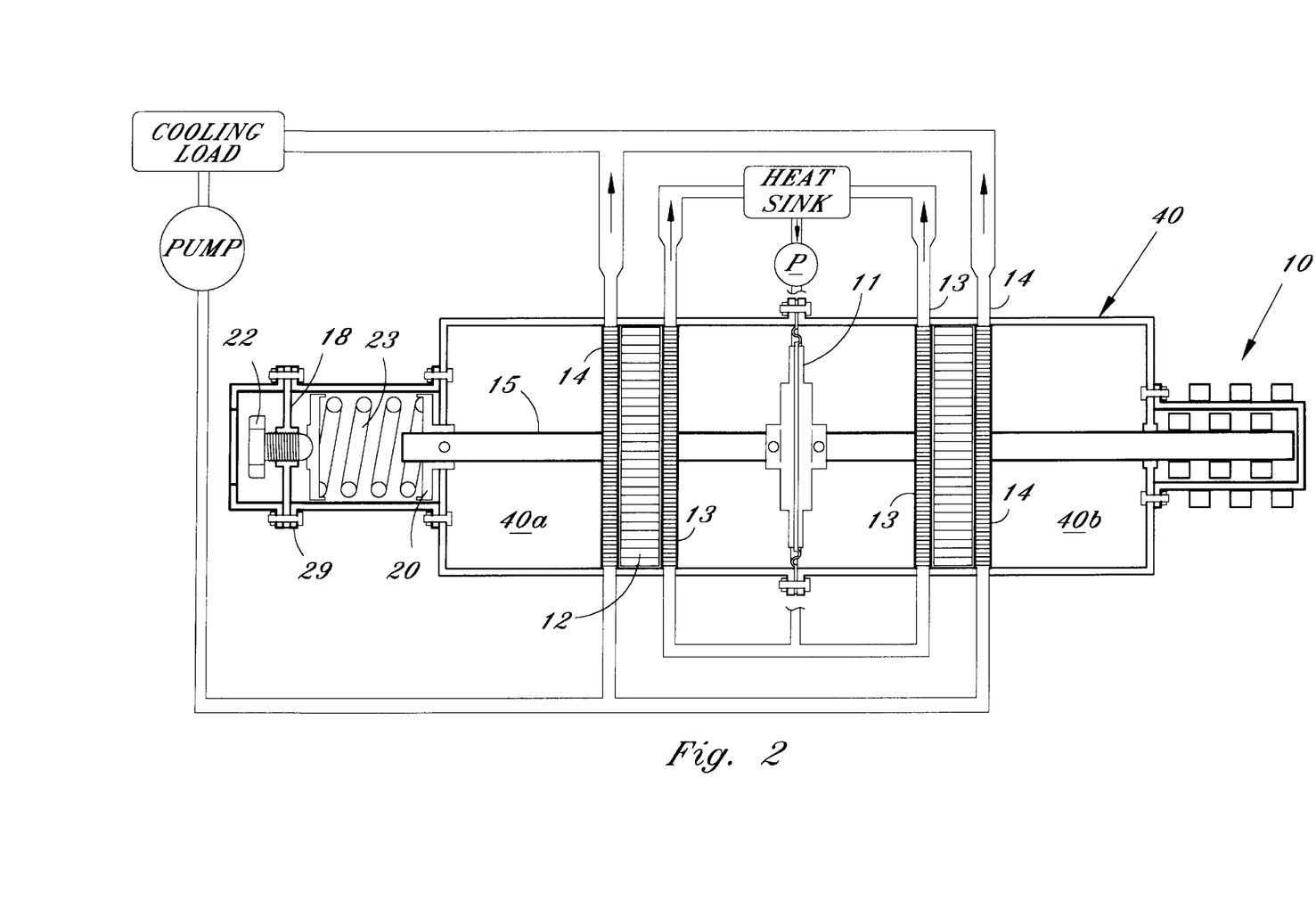
FIG. 2 is a system diagram of the instant invention illustrating the electroacoustic engine embedded in a cooling system.
Figure 3:
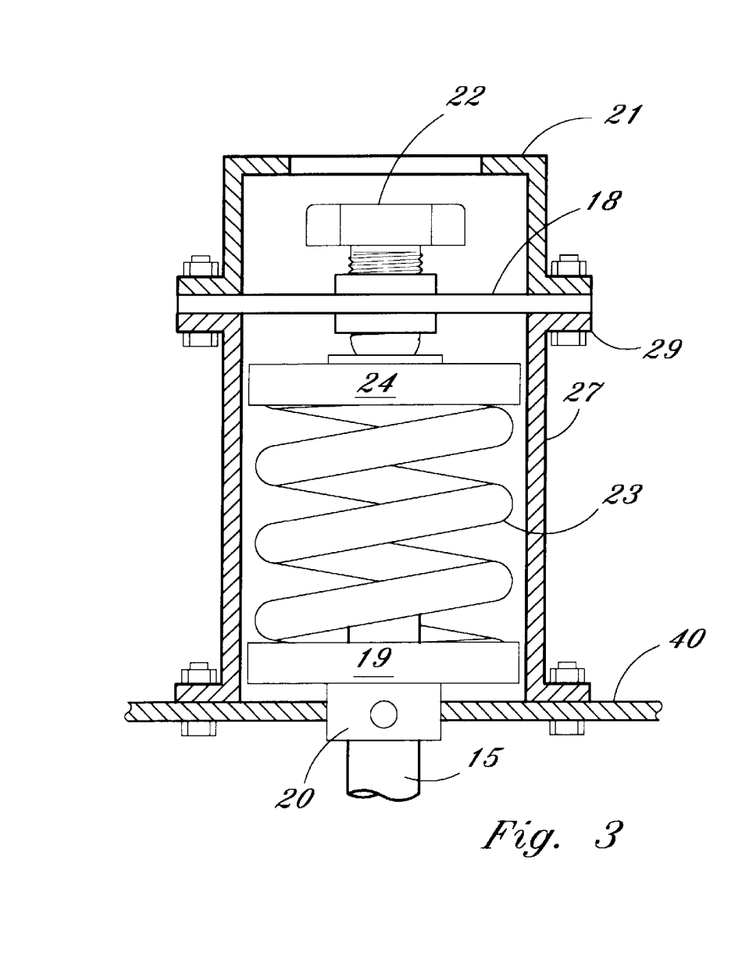
FIG. 3 is an enlarged cross sectional view of the adjustable or tuning spring of the instant invention.
Figure 4:
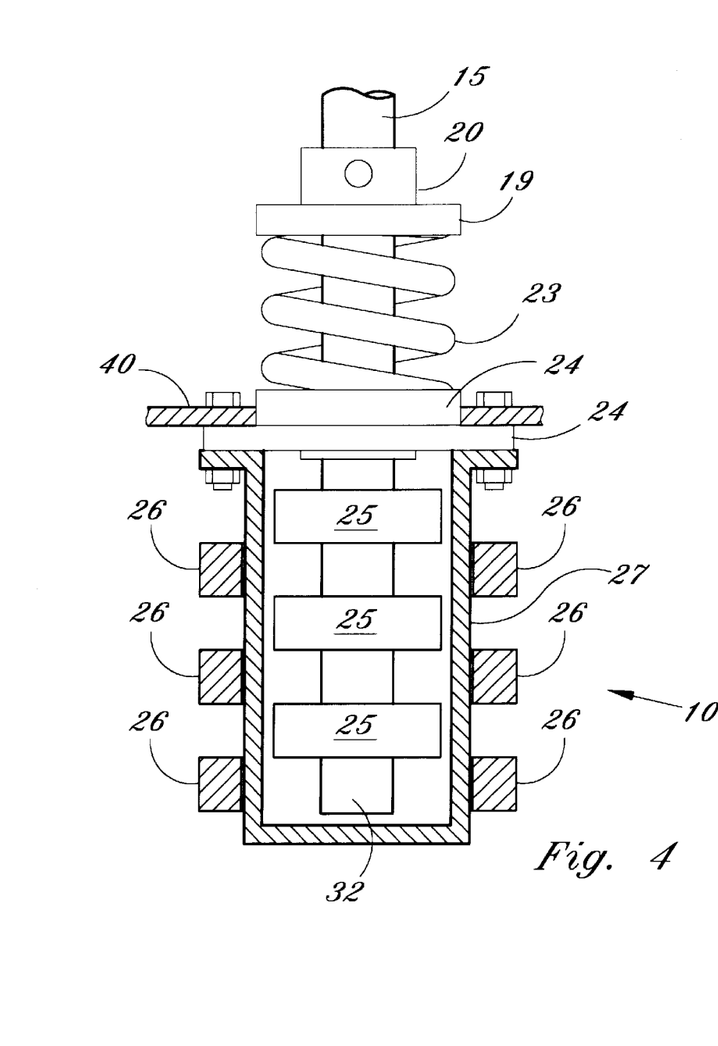
FIG. 4 is a partial enlarged view of the shaft incorporating a centering/tuning spring.
Figure 5:
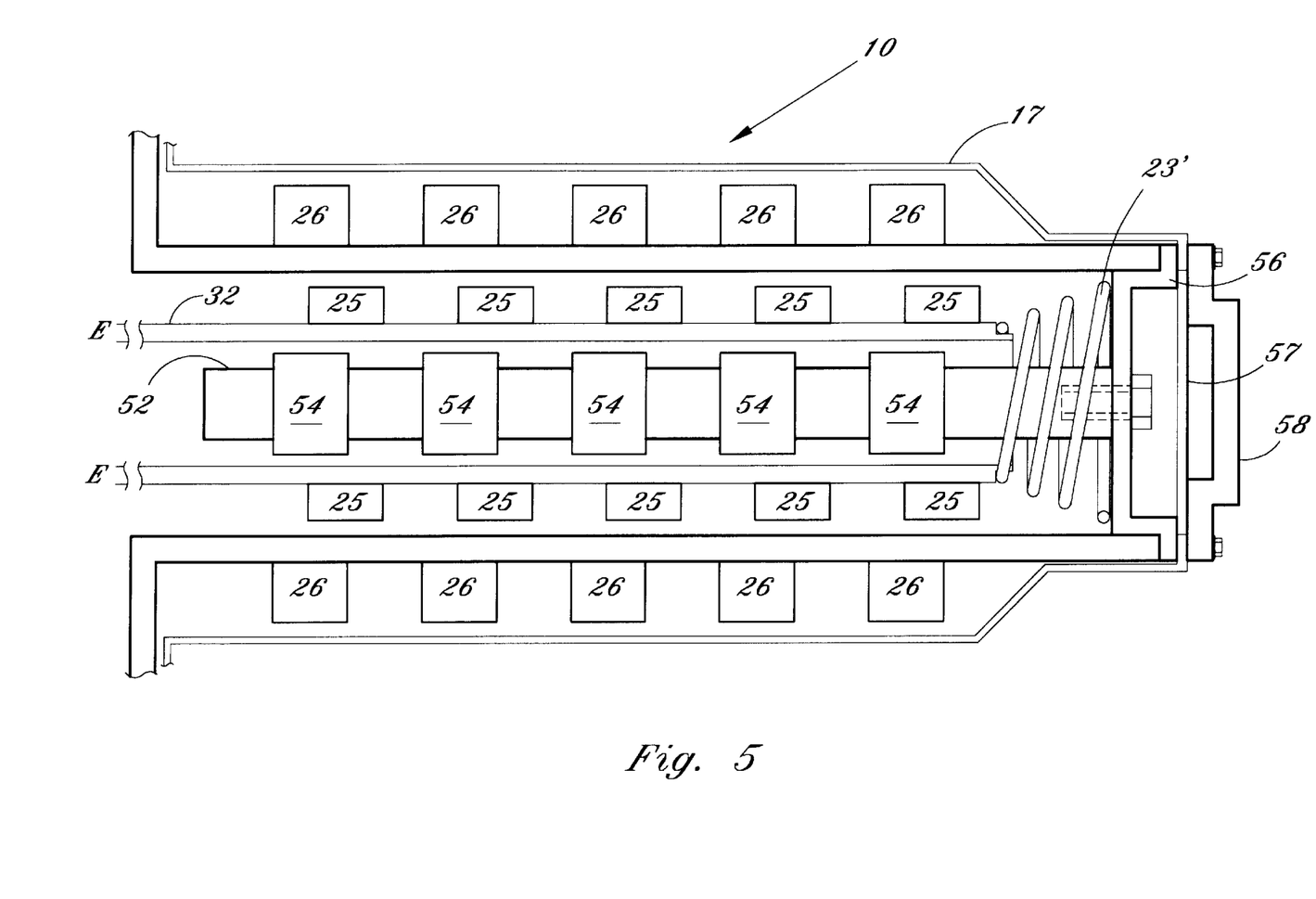
FIG. 5 is an enlarged partial cross sectional view of the electromagnetic driver of the instant invention illustrating a predetermined number of coils, magnetic cores, iron pole pieces, and the suspension positioning springs.
Figure 6:
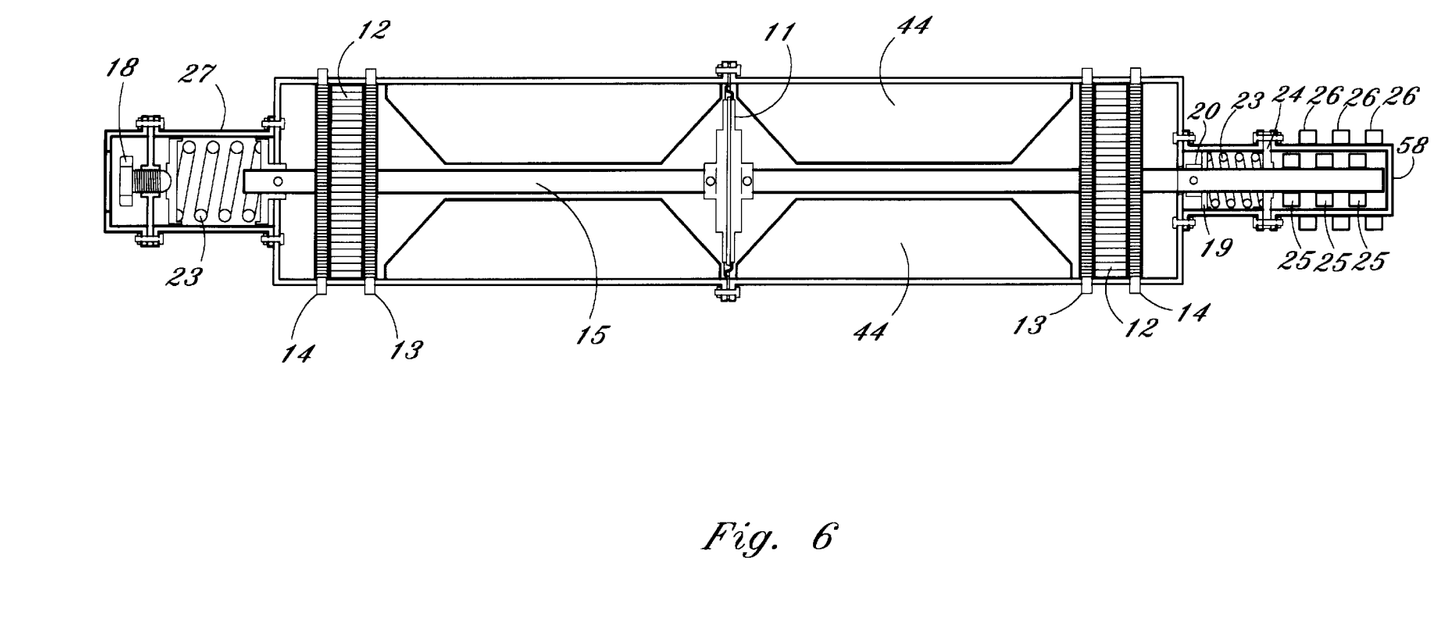
FIG. 6 is a cross sectional view of the electroacoustic cooling engine illustrating placement of trumpeting baffles for decreased volume leading to increased displacement during each stroke of the flexural disk.
Figure 7:
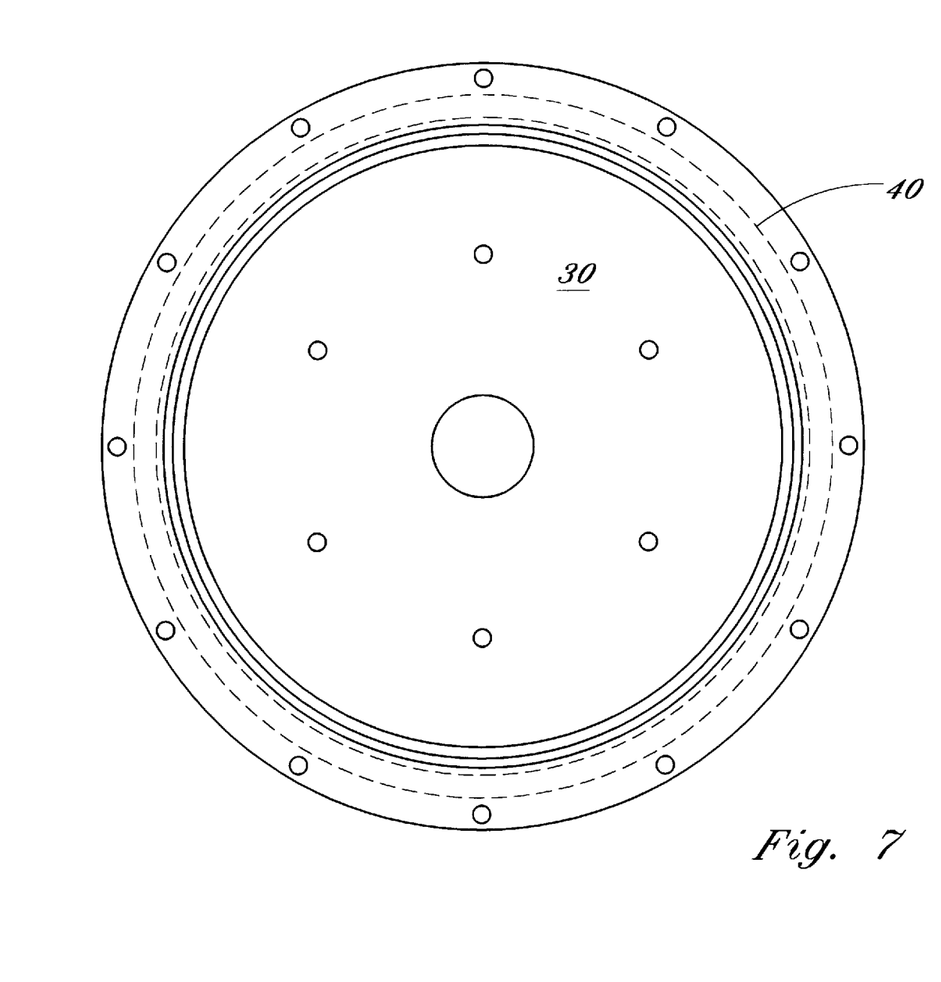

With reference to the drawings, FIGS. 1–9 illustrate the preferred embodiments of the instant invention, generally referenced by numeral 1, with the best mode of the instant invention being shown in FIG. 6. Referring to FIG. 1, the instant invention teaches a electroacoustic cooling engine 1 generally comprising a pressure vessel resonator 40, at least one flexible driver disk 11 sealingly secured in the resonator 40, two thermodynamic/thermal elements 12 per disk 11 (each one on opposite sides of the disks), a hot heat exchanger 13 and a cold heat exchanger 14 for each thermodynamic element 12 in thermal communication with opposite ends of the thermal element 12, a spring supported and suspended shaft 15 attached to each disk 11 and extending concentrically through each thermal element 12 and heat exchanger 13, 14, a double acting acoustic driver including the disk 11 and an electromagnetic driver 10 disposed outside the resonator 40 cyclically driving the flexible disk 11 via the shaft 15, and a plurality of tuning springs 23. The electroacoustic cooling unit 1 of the instant invention is employable as a chiller for ceiling fans, air conditioning systems, heat pump systems and other cooling systems intended for residential and commercial climate control, one example of which is shown in FIG. 2. The instant invention also employs a resonance frequency controller in electrical communication with the electromagnetic driver for maintaining acoustic resonance during operation.

The resonator vessel 40 of the instant invention comprises a resonating pressure container preferably formed by joining a first vessel half 40a with a second vessel half 40b. Alternatively, the resonator 40 may comprise a single uniform structure, to reduce joints, with at least one mounting ring adhered to the resonator in a central location for securing the flexural disk. The open ends of each vessel half 40a, 40b define securing flanges 29 which are used to join each half with hardware to secure the driver disk 11 therebetween in the resonator 40. A joint formed by the flange 29 must be gastight and sealed to prevent leaks and pressure drops. To seal the joint, a disk apron gasket 31 is inserted between the flanges 29, as seen in FIG. 1B. On opposite sides of the disk 11, the resonator 40 contains at least one thermodynamic element 12 and corresponding heat exchanger pairs 13, 14. The resonator 40 defines sealable ports in alignment with the heat exchangers 13, 14 to facilitate the fluid communication between the heat exchangers and cooler system conduit outside the resonator 40 so that the exchanger may receive and pass fluid loads. Extending through the resonator 40 is preferably a two part shaft 15 which attaches to opposite sides of the disk 11. The higher the anticipated frequency of operation, the shorter the shaft 15 will be. The shaft 15 extends from the disk 11 in opposite directions concentrically through each thermodynamic element 12 and heat exchanger 13, 14. At the first end, the shaft 15 is connected to a retention/tuning spring assembly for centering the shaft and providing a push-pull force on the shaft 15 for preventing any drag when the shaft and disk combination is cycled. A tuning/adjusting bolt 22 engages the spring assembly to adjust tension in the spring for fine tuning the resonator 40 and achieving acoustic resonance.

The spring assembly comprises a spring 23 contained and secured between two retention plates 20, 24. At one end of the spring 23, the shaft 15 is secured to one retention plate 20 and at the opposite end the tuning bolt engages the other plate 24. Referring to FIG. 1a, an extension cover 27 and cap 21, in combination, sealingly encloses the tuning spring assembly at one end of the resonator. With reference to FIG. 5, at the opposite end of the resonator, a ring cover 17 in combination with an end cap 58 sealingly encloses a second spring assembly 23'. Spring 23' is primarily a centering spring. The ring cover 17 is preferrably vented to allow venting of heat. At the shafts 15 opposite or second end, a stabilizing spring 23 may be attached to act in concert with the tuning spring. The stabilizing spring 23 is secured at one end with a retention cup 19 and collar 20 combination and a retention plate, all of which are joined to the shaft by hardware as known in the art. Extending from the shaft's second end is a magnetic shaft extension 32, which is more fully shown in FIG. 5. Partially secured to and concentrically disposed around the magnetic extension 32 is the electromagnetic driver 10. The electromagnetic driver 10 and non-magnetic extension 32 are also enclosed by an extension cover 17 and end plate 58 combination, as previously discussed.

The resonator 40 is charged with a compressible fluid, or gas, having a substantial thermal expansion coefficient and the ability to support an acoustic standing wave, as generated by the flexural disk. A preferred gas would be helium ($^4$He) or a mixture of helium and argon. The working gas may also be a mixture of ninety percent (90%) helium and ten percent (10%) xenon to achieve a predetermined sound speed at operating temperature. Unlike prior art devices, the instant invention is designed so that other gas or compressible fluids may be employed to achieve desired electroacoustic engine responses without having to alter the structure of the resonator vessel. For instance, the selection of the gas mixture can reduce sound speeds without degradation of thermal properties. The instant invention also precludes the need to change the resonator diameter for achieving higher performance. Choice of gas mixture can tune the engine for operation without having to make structural changes in the resonator length if the original design does not sustain resonance at the exact prescribed frequency. At the same time, however, the resonator 40 does not require a change in gas mixture to achieve resonance since the electromagnetic driver 10 is located outside the resonator 40 and is therefore easily adjusted, discussed infra. The length of each resonator half 40a, 40b is approximately equal to a half wavelength of sound in the gas mixture when operated at the designed for frequency. The resonator 40 may be charged to a predetermined mean pressure through a charging means such as a one way nozzle connected to the resonator or through an orifice that can be valved off. The internal pressures on both sides of the disk will slowly equalize through a very small equalizer port that can notched or drilled in the shaft end cap or cup, or through the disk mounting ring or the disk itself.

The acoustic driver disk 11 drives the thermodynamic elements 12. The frequency of operation of the driver disk 11 is intended to be adjustable for automatically keeping the system in resonance. The driver disk 11 comprises either an integrally formed piston or a two-part piston assembly joined by adhesives or hardware. In either structure, a flexible apron 30 defines the outer peripheral edges of the disk 11. The rigid piston portion of the disk 11 is defined by the interior area of the disk 11 which is preferably substantially rigid for greater reliability in gas displacement. Rigidity, however, may be obtained by attaching a plate to the disk 11 with hardware. The apron 30 is preferably corrugated and flexible and secured between the bolted flanges 29 of the resonator walls 40. A flexible apron 30 is required so that the disk may be cycled without experiencing fatal loading. A gasket 31 is also secured between the resonator flanges 29 to provide a substantially gastight joint. The disk 11 may be integrally formed so as to be more flexible along the peripheral edges, yet rigid in the central area of the disk, or the shaft may be joined to the disk 11 with a plate-like structure, such as 20, to secure the central areas of the disk for rigidity. Rigidity is preferred and desired along the interior surface area of the disk 11 to facilitate the greatest displacement of gas when the driver disk is cycled during operation. Additional driver disks 11 may be secured to the resonator 40 walls by adhesives or hardware, as is known in the art, to achieve greater gas displacement during operation. However, each disk employed in the resonator must have a thermodynamic element 12 and corresponding hot and cold heat exchangers positioned on each side of the disks to realize the benefits of the additional disk 11. In the same manner as discussed herein, the shaft is connected to each disk 11 and driven by the electromagnetic driver 10. A standing acoustic wave is cyclically driven by the disk 11 and driver 10 to penetrate the working gas through each thermal stack 12 for a desired thermal response.

The dual stack/thermodynamic element resonator design of the instant invention facilitates the pumping of large heat loads at the highest possible efficiency. The piston/disk 11 is linearly moved to generate acoustic pressures in both vessel halves 40a, 40b, so as to justify the employment of two stacks and four heat exchangers whereby the problem of driver back volume stiffness is eliminated. That is, there is no back volume problems since both volumes of the resonator 401, 40b are loaded. An additional benefit of the dual thermal element design is that the thermodynamic stack diameters may be reduced by thirty to forty percent (30%–40%) to achieve the same heat pumping capacity in a single thermodynamic element design.

Figure 8:
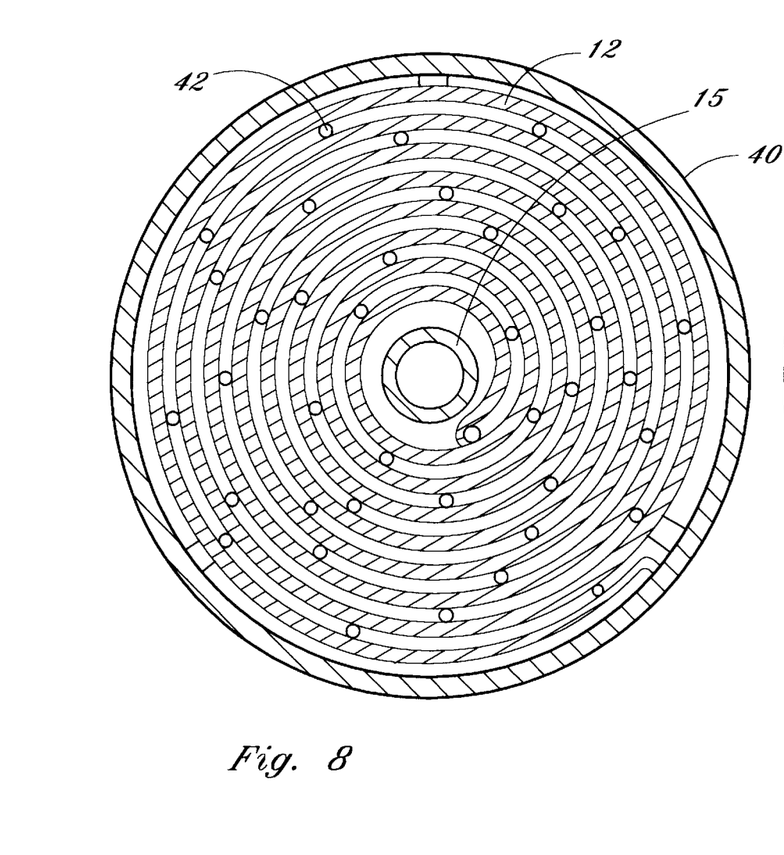
FIG. 8 is a cross sectional view of the instant invention taken along line 8—8 of FIG. 1.

Referring to FIGS. 1 and 8, a thermodynamic element 12 is secured on opposite sides of the disk 11 within their respective resonator halves 40a, 40b, or volume vessel. Each thermal element 12 is designed with predetermined thermal properties to provide desired temperature differentials at predetermined frequencies across the elements 12 to effectuate heat transfer. The thermodynamic elements 12 may resemble stacks of plates in cross section and thus may be referred to as a thermal stack 12. The width of the thermal stacks 12 when viewed from the side, as in FIGS. 1 and 2, is preferably much less than the wavelength of sound produced by the driver. As seen in FIG. 8, the thermodynamic element or stack 12 has a predetermined spacial relationship whereby the ratio of stack spacing to thermal penetration depth is large enough that hyperbolic tangents involving that ratio can be set equal to one or other ratios depending on the desired thermal response. This spacing is achieved by at least one mylar or nylon spacer 42, similar to a monofilament fishing line, such as a ten pound fishing line. Other nylon lines may serve as spacers without departing from the scope and spirit of the instant invention. The fishing line is preferably placed substantially perpendicular to the unrolled longitudinal axis of the element 12. Thus, the stack element 12 may in its infant state comprise a flat sheet of non-metallic material, such as Kapton®, mylar, or plastic with similar non-conductive properties, that is coiled in a spiral by rolling the sheet with at least one spacer 42 secured in place. The spacers 42 may be secured by adhesives. A coiled structure is preferred. Since a thermodynamic stack 12 is positioned on both sides of a disk 11, the configuration is often referred to as a dual stack. The driver disk 11 when driven, cyclically drives the gas with a resonant acoustic standing wave at a predetermined frequency corresponding to the length of the resonator 40 for resonance, such that gas oscillates in the stack 12 experiencing a gradient temperature drop.

The thermodynamic element 12 is shown in cross section in FIG. 8. The material selected for the thermodynamic element 12 has a predetermined thermal penetration depth conducive to removing desired amounts of heat from the working gas load. The thermodynamic element or stack 12 is constructed by rolling up a sheet of non-metallic material, as noted above, in a spaced relationship. The stack material has a predetermined width, based on the temperature gradient, or temperature difference desired across the stack, and the spacing between the plates or layers of the rolled materials is determined by the size and placement of the spacer material. The stack is spaced by the attachment of the spacers 42.

The thermodynamic element 12 is located within the resonator 40 in a position which is between a pressure node and antinode, in one embodiment. In another embodiment, the thermal element 12 may be separated from the disk 11 by a trumpeting baffle 44, discussed infra. A first end of the thermal element 12 may be defined as the hot end since it is closer to the acoustic driver disk 11 while the opposite end may be referred to as the second or cold end. The thermodynamic element 12 comprises a material as noted above which is thermally responsive to the acoustic standing wave generated such that it pumps heat from the cold end to the hot end. The thermodynamic element 12 has a heat capacity within a thermal penetration depth of the boundary of the element 12 in the gas which may be known in the art.

Figure 9:
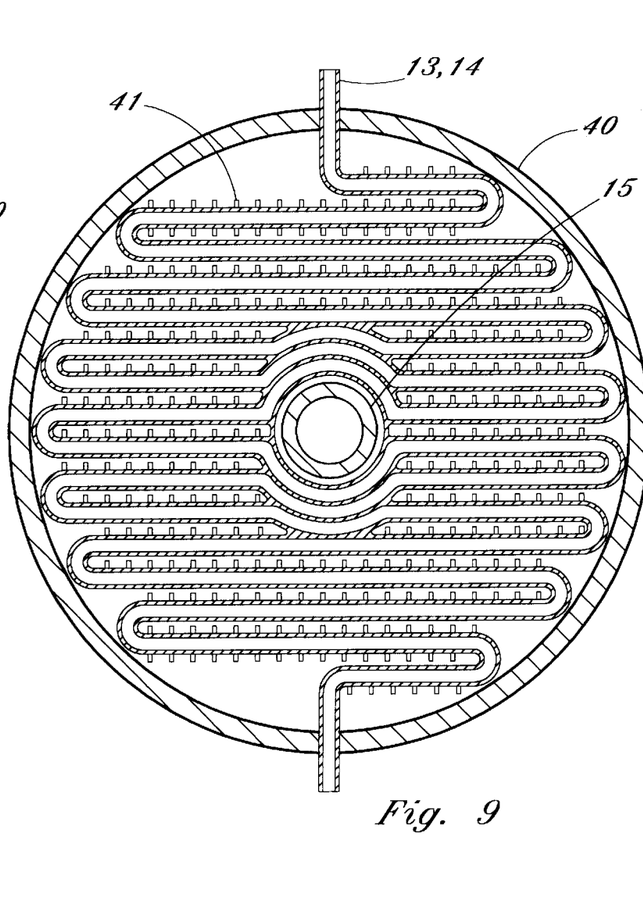
FIG. 9 is a cross sectional view of the instant invention taken along line 9—9 of FIG. 1.

Each thermodynamic element 12 thermally communicates with a pair of heat exchangers 13, 14, as shown in FIG. 9. A hot heat exchanger 13 is preferably positioned in thermal communication with the first end of the stack 12 proximate to the acoustic disk driver 11 in the resonator vessel 40a or 40b, having a length of approximately one-half a wavelength. Meanwhile, the cold heat exchanger 14 is positioned in thermal communication with the second end of the stack 12, as shown in FIGS. 1 and 2. With reference to FIG. 2, both exchangers are in fluid communication with a fluid working load which is pumped through the exchangers by way of conduits coupled to ports defined by the exchangers 13, 14. Two pumps P are employed for pumping fluid through each path. Flow switches and fan switches may also be incorporated into a system for determining when to power the system. The hot heat exchanger 13 may comprise a coiled copper tubing, or it may be folded repeatedly over itself, as seen in FIG. 9. The tubing is preferably finned with a plurality of thin copper or aluminum plates 41 closely spaced apart for increased thermal efficiency. The hot heat exchanger 13 may also comprise a copper ring enclosure having a plurality of copper strips strategically spaced apart. The copper employed is selected with a predetermined thickness depending on the thermal response desired. The cold heat exchanger 14 is constructed in the same manner as the hot heat exchanger except that the separation between the copper layers is preferably greater. The thermal response of the thermodynamic element 12 produces a hot end adjacent to and in thermal communication with the hot heat exchanger 13 such that the work load is heated when passed therethrough. By contrast, the opposite end of the thermodynamic element is relatively colder and in thermal communication with the cold heat exchanger 14 such that a work load is cooled when passing therethrough.

The instant invention may comprise an additional structural enhancement to address the problem of reverse heat conduction or flow, a problem known to contribute to a loss of efficiency. To prevent reverse heat conduction, the thermodynamic element 12 may include micro-thin slices in its plate material in a dash dot fashion, preferably perpendicular to the gas mixture's flow path to prevent reverse temperature conduction. Approximately one row of slices is preferably desired for each centimeter of stack length to match with the disk driver 11 displacement stroke. Placing each row of slices substantially perpendicular to the gas mixture flow decreases the amount of reverse conduction currently experienced in conventional thermodynamic stacks as employed in current heat pumps. The slices act as an insulator or check valve to retard the reverse conduction of heat through the plate material. Any reduction in the amount of reverse heat conduction through the plate stack material 12 increases the overall efficiency of the stack 12 and thermal acoustic engine 1 by reducing internal losses.

The thermal response of the instant invention is accomplished by the acoustic driver which comprises an electromagnetic driver 10 as shown in FIGS. 4, 2 and 5. The electromagnetic driver 10 is in magnetic and mechanical communication with one end of the shaft 15 and is positioned outside the interior volume of the resonator 40 to prevent internal heating inside the resonator 40. Another advantage of placing the electromagnetic driver 10 outside the resonator 40 is that no wires have to be run from outside the vessel 40 to inside the vessel 40. This eliminates the number of joints and seals which could potentially fail.

With reference to FIG. 5, the electromagnetic driver 10 generally comprises a plurality of electric or solenoid drive coils 26 and a plurality of permanent magnetic rings or cores 25, both of which are concentrically disposed around the shaft extension 32. The electromagnetic driver 10 also includes a fixed non-magnetic aluminum spacer piece 52 and a plurality of iron pole pieces 54 inserted into the non-magnetic extension bar's 32 open end that extends from the end plate 56 of the driver shaft enclosure 17 into the end of the hollow shaft. An additional alignment spring 23' may also be included to act as a centering spring. The permanent magnetic rings 25 and electric drive coils 26 are perfectly arranged to effect a push pull force on the shaft 15 when the shaft 15, shaft extension, and rings 25 are cycled at a known velocity perpendicular to the magnetic field of density. When incorporating the aluminum spacer sections 52 and the iron pole pieces 54, the iron pole pieces must be strategically arranged in relation to the magnetic rings 25 and electric drive coils 26 to accomplish the additional push pull force desired. For instance, it is desired that the number of coils 26 correspond to the number of magnetic rings 25 and iron pole pieces 54. Since the electromagnetic driver loses heat during operation, the instant invention presents an improvement over prior devices by driving the acoustic displacement disk 11 from outside the resonator volume 40 so that heat losses do not affect the thermal efficiency inside the resonator 40. A driver cover 17 may be attached over the electromagnetic driver 10 with a collar 56, end plate 57 and cap 58 to seal the resonator 40 and protect the driver's power coils 26 from rain. The driver cover 17 may be securely attached by other means, such as straps. The driver coil cover 17 may be vented so as to dissipate heat to the outside of the system. The vent slots should be facing down toward the bottom side so as to avoid the entrance of rainwater on the coils.

It is well known in the art that the main problem with acoustic heat pumping engines is the significant internal heating that occurs with conventional systems. One source of internal heating is from the acoustic driver. Another source of internal heating is reverse heat conduction. Slits may be defined in the thermal stack plates 12 to reduce the reverse conduction losses. The other primary source of internal heating is solved by situating the electromagnetic driver 10 outside the internal volume of the resonator 40. In addition to reducing heat loss, the electromagnetic driver 10 does not create weight problems that could ultimately decrease efficiency. An additional benefit of placing the electromagnetic driver outside the resonator 40 is the ability to conveniently change power capacity from the exterior and perform resonance tuning. Furthermore, outside the resonator 40, the electromagnetic driver 10 is not confined to space and can have as many coil turns 26, magnetic rings 25 and iron pole pieces 54 as desired. Referring to FIG. 5, the ease in which power capacity my be adjusted is evident. Thus, the instant invention allows for as many power coils as is needed to achieve desired power levels.

The instant invention affords flexibility in electromagnetic power and efficiency whereby the number of turns is adjustable, based on current requirements. Since the electromagnetic driver 10 is positioned outside the resonator and is not mechanically connected to the shaft 15, the invention is not limited by the number of coil turns or weight. That is, a very large number of turns may be added to the driver coils so as to increase the magnetic field strength without suffering the drawbacks of the additional weight. This method facilitates a way to build higher capacity air conditioners, heat pumps, refrigerators or any other electroacoustic application. Best of all, there are no internal heating problems as associated with conventional cooling systems.

With reference to FIG. 6, the instant invention may alternatively employ rigid trumpeting baffles 44 for reducing the internal volume of the resonator 40 with a shape that reduces viscous losses in the gas mixture. The trumpeting baffles 44 decrease the internal volume of the resonator 40 which increases the percentage of displacement of gas with each stroke of the disk 11. As a result, the gas penetration into the thermal stacks 12 is increased with each stroke of disk 11 displacement resulting in higher power density for the unit. The trumpeting baffles 44 may be smooth in structure and made from a material known to have low resistance to flow. The baffles 44 may be manufactured from a plastic, fiberglass, steel, textile or other rigid like material. However, the baffles are preferably manufactured from an insulation material to provide insulation from the exterior wall and to reduce conduction and viscous losses that are known to inhibit the flow of gas.

The baffles offer several other advantages. The baffles 44 help to prevent an impedance mismatch between the free resonator 40 volume and the thermodynamic elements 12, and prevent the formation of shock waves in the gas mixture. Since trumpeting baffles 44 are preferably rigid, they may be attached or pressed against the flexural disk 11 mounting ring to assist in the securing of the flexural driver disk 11 or mounting ring. By placing the volume reduction trumpeting baffles 44 inside the resonator 40, the electroacoustic cooling engine 1 of the instant invention may be manufactured to reduce potential leaking since fewer joints would be required. The insulating properties of the baffles 44 will improve the efficiency of the operation of the instant invention. The baffles 44 allow for the elimination of expensive steel piping transitions and the additional labor associated with the assembly process.

In operation, the electromagnetic driver 10 oscillates the shaft 15 through a series of hot heat exchangers 13, cold heat exchangers 14 and thermal stacks 12 which are positioned in thermal communication with each other. The stroke amplitude preferably comprises approximately 5 to 15 percent of the volume between the disk 11 and the heat exchangers 13, 14. When driven, the acoustic driver disk 11 cyclically drives an acoustic standing wave in the gas mixture on both sides of the disk 11 thereby increasing the usable cooling capacity by 100 percent. That is, both the forward and backward strokes of the disk are utilized. The tuning and suspension springs 23 support the shaft, prevent drag forces and eliminate all back pressure problems. In addition, the springs and electromagnetic driver 10 eliminate the need for lubricating bushing and bearings and allows for easier centering adjustments. The adjusting bolt 22 facilitates convenient fine tuning of the centering spring 23 so as to provide an alternate method for achieving resonance compared to adjusting the gas mixture, a tedious and expensive process. This allows for standardization in the gas mixture for all units as opposed to having to provide different mixtures for each unit. The uniqueness of running the shaft 15 through the center of the heat exchangers 13, 14 and stack assemblies 12 is facilitated by an energy transferring technique involving the driver mechanism 10, the driver disk 11, and the shaft 15. This design prevents the internal heating that is normally created by conventional electroacoustic engines that are driven from inside the electroacoustic engine.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A electroacoustic cooling engine for cooling or heating a fluid working load, said engine comprising:
    a vessel for containing a compressible fluid which is capable of supporting an acoustic standing wave having a predetermined wavelength, said vessel having a first volume and a second volume;
    driving means, supported by said vessel, for cyclically driving said compressible fluid to simultaneously generate a first standing acoustic wave in said first volume and a second standing acoustic wave in said second volume;
    thermodynamic means, positioned inside said first volume and said second volume, for thermally and independently responding to said first acoustic standing wave and said second acoustic standing wave so that said first and second acoustic standing wave independently cause heat to be pumped towards said driving means;
    heat conductor means, in thermal communication with said thermodynamic means, for conducting heat away from said thermodynamic means; and
    cooling means supported by said vessel for cooling the fluid working load, said cooling means being in thermal communication with said thermodynamic means.

2. A electroacoustic engine as recited in claim 1, wherein said driving means comprises:
    a driver disk movably secured inside said vessel between said first volume and said second volume; and
    means for cycling said driver disk back and forth to simultaneously generate said first acoustic standing wave in said first volume and said second acoustic standing wave in said second volume, said cycling means being partially disposed outside said first and second volumes.

3. A electroacoustic engine as recited in claim 1, wherein said thermodynamic means comprises:
    a first thermodynamic means having a first end and a second end, positioned inside said first volume, for thermally responding to said first acoustic standing wave to cause heat to be pumped from said first end to said second end so as to thermally isolate said second end from said driving means, said first end being closer to said driving means than said second end; and
    a second thermodynamic means having a first end and a second end, positioned inside said second volume, for thermally responding to said second acoustic standing wave, to cause heat to be pumped from said first end to said second end so as to thermally isolate said second end from said driving means, said first end being closer to said driving means than said second end.

4. A electroacoustic engine as recited in claim 3, wherein said heat conductor means comprises:
    a first heat exchanger, in thermal communication with said first end of said first thermodynamic means, for conducting heat away from said first end of said first thermodynamic means; and
    a second heat exchanger, in thermal communication with said first end of said second thermodynamic means, for conducting heat away from said first end of said second thermodynamic means.

5. A electroacoustic engine as recited in claim 1, wherein said heat conductor means comprises:
    a first heat exchanger secured in said first volume in thermal communication with said thermodynamic means for conducting heat from said thermodynamic means; and
    a second heat exchanger secured in said second volume in thermal communication with said thermodynamic means for conducting heat from said thermodynamic means.

6. A electroacoustic engine as recited in claim 1, wherein said cooling means comprises:
    a first cold heat exchanger secured in said first volume in thermal communication with a cold end of said thermodynamic means, for passing and cooling the fluid working load; and
    a second cold heat exchanger secured in said second volume in thermal communication with a cold end of said thermodynamic means, for passing and cooling the fluid working load.

7. A electroacoustic engine as recited in claim 3, wherein said cooling means comprises:
    a first cold heat exchanger in thermal communication with said second end of said first thermodynamic means for passing and cooling the working fluid load passing through said first cold heat exchanger; and
    a second cold heat exchanger in thermal communication with said second end of said second thermodynamic means for passing and cooling the working fluid load passing through said second cold heat exchanger.

8. A electroacoustic engine as recited in claim 1, further comprising:
    at least one volume reducing baffle secured inside said first and second volumes, said first and second volumes having a volumetric size, said baffles reducing the volumetric size of said first and second volumes for a larger displacement percentage of the compressible fluid during each cycle of said driving means.

9. A electroacoustic engine as recited in claim 2, wherein said cycling means comprises:
    at least one shaft attached to said driver disk, said shaft extending through said vessel and partially disposed outside said vessel; and
    an electromagnetic driver secured outside said vessel for preventing heat transfer into said vessel, said electromagnetic driver being in magnetic communication with said shaft for electromagnetically driving said shaft to cycle said driver disk.

10. A electroacoustic engine as recited in claim 2, wherein said cycling means comprises:
    an electromagnetic driver secured outside said vessel to magnetically cycle said driver disk.

11. A electroacoustic engine as recited in claim 9, further comprising:
    means for adjusting positioning of said shaft to obtain resonance.

12. A electroacoustic engine as recited in claim 9, further comprising:
    means for mechanically achieving resonance when driving said shaft for increased efficiency.

13. A electroacoustic engine as recited in claim 12, wherein said resonance achieving means comprises:
    a spring connected to said vessel and said shaft.

14. A electroacoustic engine as recited in claim 13, further comprising:

means for adjusting positioning of said shaft, said adjusting means being in mechanical communication with said spring.

15. A electroacoustic engine as recited in claim 1, wherein said vessel has a length equal to ¼ to ½ said predetermined wavelength.

16. A electroacoustic cooling engine for cooling a fluid working load, said engine comprising:

a vessel for containing a compressible fluid which is capable of supporting an acoustic standing wave having a predetermined wavelength, said vessel having a first volume and a second volume;

a driver disk movably secured inside said vessel between said first volume and said second volume;

means for cycling said driver disk back and forth to simultaneously generate a first standing acoustic wave in said first volume and a second standing acoustic wave in said second volume, said first acoustic standing wave and said second acoustic standing wave having a frequency corresponding to a length of said vessel, said cycling means being partially disposed outside said first and second volumes;

thermodynamic means, positioned inside said first volume and said second volume, for thermally and independently responding to said first acoustic standing wave and said second acoustic standing wave so that said first and second acoustic standing waves independently cause heat to be pumped towards said driving disk;

a first heat exchanger disposed in said first volume in thermal communication with said thermodynamic means for conducting heat towards said driver disk;

a second heat exchange positioned in said second volume, in thermal communication with said thermodynamic means for conducting heat towards said driver disk; and cooling means supported by said vessel for cooling a working fluid load, said cooling means being in thermal communication with a cold end of said thermodynamic means for cooling a fluid working load.

17. An engine as recited in claim 16, wherein said thermodynamic means comprises:

a first stack element disposed in said first volume between said first heat exchanger and said cooling means; and a second stack element disposed in said second volume between said second heat exchanger and said cooling means, said first and second stack elements being manufactured from a non-metallic material having poor heat conductive properties.

18. An engine as recited in claim 17, further comprising:

means for providing space between each level of said first stack element and said second stack element, said spacing means comprising a non-conducting material.

19. An engine as recited in claim 16, wherein said first; heat exchanger and said second heat exchanger comprise:

a multi-layered copper tubing for passing a working fluid.

20. An engine as recited in claim 19, wherein said first and second heat exchangers further comprise:

a plurality of thin, metallic plates intersecting said first and second heat exchanger between said layers.

21. An engine as recited in claim 16, wherein said driver disk comprises:

a disk sealingly dividing said first volume from said second volume, said disk being attached to said vessel's inner walls, said disk having a rigid midsection and a pliable outer peripheral edge so as to facilitate cycling.

22. A electroacoustic cooling engine comprising:

a pressurized vessel for containing a compressible fluid which is capable of supporting an acoustic standing wave having a predetermined wavelength, said vessel having a first volume and a second volume;

acoustic driver means for generating a first acoustic standing wave in said first volume and second acoustic standing wave in said second volume at a frequency corresponding to said predetermined wavelength, said first and second standing waves being supported and driven by said acoustic driver means and a compressible fluid at a frequency corresponding to said predetermined wavelength, said acoustic driver means comprising a driver disk being secured and positioned between said first and second volumes, said acoustic driver means being electromagnetically cycled from outside said vessel;

a first thermodynamic means, positioned inside said first volume, for thermally responding to said acoustic standing wave to cause heat to be pumped from a first end to a second end, thereby thermally isolating said second end from said driver disk, said first end being proximate said driver disk;

a second thermodynamic means, positioned inside said second volume, for thermally responding to said acoustic standing wave to cause heat to be pumped from a first end to a second end, thereby thermally isolating said second end from said driver disk, said first end being proximate said driver disk;

at least one heat conductor means, in thermal communication with each of said thermodynamic means, for conducting heat away from said first end of said first and second thermodynamic means; and at least one cold heat exchanger, in thermal communication with each of said thermodynamic means, so as to cool a fluid working load passing therethrough.

23. A electroacoustic engine as recited in claim 22, further comprising:

at least one volume reducing baffle secured inside said first and second volumes, said first and second volumes having a volumetric size, said baffles reducing the volumetric size of said first and second volumes for a larger percentage displacement of the compressible fluid during each cycle of said driving means.

24. A electroacoustic engine as recited in claim 22, wherein said electromagnetic acoustic driver means comprises:

at least one shaft attached to said driver disk, said shaft extending through said vessel and partially disposed outside said vessel; and an electromagnetic driver secured outside said vessel for preventing heat transfer into said vessel, said electromagnetic driver being in magnetic communication with said shaft for electromagnetically driving said shaft to cycle said driver disk.

* * * * *